United States Patent
Jackson et al.

(10) Patent No.: US 12,351,103 B2
(45) Date of Patent: Jul. 8, 2025

(54) SAFETY VIEW PASSENGER DOOR MIRROR DEVICE

(71) Applicants: David Jackson, Bronx, NY (US); Laela Jackson, Bronx, NY (US)

(72) Inventors: David Jackson, Bronx, NY (US); Laela Jackson, Bronx, NY (US)

( * ) Notice: Subject to any disclaimer, the term of this patent is extended or adjusted under 35 U.S.C. 154(b) by 0 days.

(21) Appl. No.: 18/655,665

(22) Filed: May 6, 2024

(65) Prior Publication Data
US 2025/0042329 A1   Feb. 6, 2025

Related U.S. Application Data (60) Provisional application No. 63/517,477, filed on Aug. 3, 2023.

(51) Int. Cl.
*B60Q 1/26* (2006.01)
*B60Q 1/32* (2006.01)
*B60R 1/06* (2006.01)

(52) U.S. Cl.
CPC ......... *B60Q 1/2665* (2013.01); *B60Q 1/2615* (2013.01); *B60Q 1/324* (2022.05); *B60R 1/06* (2013.01)

(58) Field of Classification Search
CPC .... B60Q 1/2665; B60Q 1/324; B60Q 1/2615; B60R 1/06
See application file for complete search history.

(56) References Cited

U.S. PATENT DOCUMENTS

| | | | | |
|---|---|---|---|---|
| 9,586,526 | B2* | 3/2017 | Pastrick | F21S 43/241 |
| 11,173,831 | B2* | 11/2021 | Yagüe | B60Q 1/2665 |
| 2005/0242934 | A1* | 11/2005 | Lang | B60Q 9/006 |
| | | | | 359/844 |
| 2009/0273941 | A1* | 11/2009 | Englander | B60Q 1/324 |
| | | | | 362/494 |
| 2012/0194356 | A1* | 8/2012 | Haines | G08G 1/161 |
| | | | | 340/933 |
| 2017/0210282 | A1* | 7/2017 | Rodriguez Barros | B60Q 1/324 |
| 2022/0153196 | A1* | 5/2022 | Lynam | B60R 1/1207 |

OTHER PUBLICATIONS

Innovation Q+ NPL Search (Year: 2024).*
Amazon.com search (Year: 2024).*

* cited by examiner

*Primary Examiner* — Anabel Ton
(74) *Attorney, Agent, or Firm* — Brennan, Manna & Diamond, LLC (57) ABSTRACT

A safety view passenger door mirror device is provided. The device is comprised of a body containing at least one but preferably two mirrors, a fastener, a battery, a charging method, a motion sensing component, and a light. The device can be fastened to a passenger vehicle and can be used to provide the passenger with extended visibility of the vehicle's surroundings. It can also detect nearby hazards and alert passengers and motorists in the vicinity of a potentially hazardous situation, reducing the risk of injury, collision, or harm.

14 Claims, 4 Drawing Sheets

SAFETY VIEW PASSENGER DOOR MIRROR DEVICE

CROSS-REFERENCE TO RELATED APPLICATION

The present application claims priority to, and the benefit of, U.S. Provisional Application No. 63/517,477, which was filed on Aug. 3, 2023, and is incorporated herein by reference in its entirety.

FIELD OF THE INVENTION

The present invention relates generally to the field of vehicle mirrors. More specifically, the present invention relates to a safety view mirror device that allows passengers in the rear of a vehicle to view oncoming traffic and warn oncoming traffic of the possibility of an opening door or passenger exit. Accordingly, the present disclosure makes specific reference thereto. Nonetheless, it is to be appreciated that aspects of the present invention are also equally applicable to other like applications, devices, and methods of manufacture.

BACKGROUND

Opening the rear passenger doors of a vehicle can be dangerous due to the lack of visibility, especially in regard to oncoming traffic from behind the vehicle. In addition, vehicles, motorcycles, bicycles, and other parties in the blind spot of the parked vehicle cannot be directly seen by the passenger exiting the vehicle. This lack of visibility and awareness of one's surroundings can pose a risk to passengers and other motorists alike. Serious accidents and injuries can occur if oncoming motorists do not see another vehicle's door in an open position and a passenger exiting the vehicle. Furthermore, passengers are at greater risk of accident or injury if they do not have a comprehensive view of their surroundings when opening the door and/or exiting the vehicle.

Therefore, there exists a long-felt need in the art for a device that eliminates the blind spot for passengers exiting vehicles and alerts oncoming traffic to an opening door or exiting passenger. More specifically, there exists a long-felt need in the art for a device that provides the passenger of a parked vehicle full awareness of their surroundings, especially in the vehicle's blind spot Additionally, there exists a long-felt need in the art for a device that alerts nearby and oncoming motorists to the possibility of an opening vehicle door and/or exiting passenger, providing substantial reaction time and reducing the risk of injury to motorists and passengers alike. Furthermore, there exists a long-felt need in the art for a safety view passenger door mirror device that can be applied to the back passenger doors of a vehicle to eliminate blind spots, alert other motorists, and reduce the risk of collision and injury, wherein the device can be universally applied to any vehicle.

The subject matter disclosed and claimed herein, in one embodiment thereof, comprises a safety view passenger door mirror device. The device is comprised of a body comprised of at least one mirror; at least one blind spot mirror; a method of charging the device, preferably comprised of a solar panel, battery, and/or AC charging port; a fastener by which the device would be attached to the vehicle; a motion sensing mechanism; and an alert system, preferably comprised of a light and/or audio indicator. During use, the device is positioned on a rear pillar/door of a vehicle such that a user can view oncoming traffic, people, etc. In addition, the alert system may alert said oncoming traffic that a passenger is exiting the vehicle.

In this manner, the safety view passenger door mirror device of the present invention accomplishes all the foregoing objectives and provides a device that eliminates blind spots from the back passenger doors of a vehicle. More specifically, the safety view passenger door mirror device can be applied to a passenger door of a vehicle to eliminate the passenger's blind spot, alert them to oncoming traffic, and alert nearby motorists to the presence of a passenger and the opening of a vehicle door, reducing the risk of collision and injury. Furthermore, the device can be applied to any vehicle.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a safety view passenger door mirror device comprised of a body, at least one mirror, a charging method, a fastener, and an alert system. The device is designed to be secured to the back passenger door(s) of a vehicle to alert passing motorists of a present passenger or opening door, and to provide passengers with a comprehensive view of their surroundings outside of the vehicle.

During use, the device is positioned on the back passenger door/door pillar of the vehicle such that it provides the passenger an enhanced view of the vehicle's surroundings. To do so, the device employs a mirror system, preferably comprised of a regular mirror and a blind spot mirror. The two mirrors work in tandem to provide the passenger with an enhanced view of the surrounding area.

The device also employs an alert system. During use, the alert system will preferably work in two ways. First, the device alert system uses a motion sensor to determine whether there is a hazard—such as a vehicle, motorcycle, or cyclist—in the near vicinity. The alert system preferably uses a light, a sound, or combination of both to signal to the uses that it is not yet safe to open the passenger door and/or exit the vehicle. Furthermore, the motion detecting alert system can also serve as a warning to nearby motorists or cyclists that there is a passenger present in the parked car, and that there is a possibility of the door opening and/or the passenger exiting the vehicle. Lastly, the device is comprised of a system of charging, preferably including a solar charging mechanism, a battery mechanism, an AC power mechanism that can connect directly to the car, or a similar entity or combination of the aforementioned charging options.

The present invention is also comprised of two methods of using the device. In a first method, the device is provided to the user as an entity separate (i.e., removably attached) from the vehicle. First, a device is provided comprised of a body, a solar panel, a stem, at least one fastener, a rear surface with at least one first mirror and at least one second mirror, a battery, a charging port, at least one light, and at least one motion sensor. Then, the device is attached to the vehicle by way of the fastener, wherein the device is fastened to the vehicle on the door pillar in the area between the first side window and the second side window. A user can then adjust the first mirror such that it is visible to the user while sitting in the rear of vehicle and provides an extended view of the surroundings of the vehicle, and position the second mirror such that it provides the passenger of the vehicle with enhanced vision of the blind spot area of the vehicle. Then, when a user wishes to exit the vehicle, the user can look into the mirrors to check for oncoming traffic. Upon detecting a motion considered to be hazardous based on its size and distance from the parked vehicle, and/or upon detection of the vehicle door opening, the motion sensor triggers the light mechanism such that light illuminates in such a way that it alerts nearby motorists of a present passenger and opening door, and in such a way that it alerts the passenger of the presence of a motorist or other such hazard in the near vicinity, effectively providing advanced information and awareness of the situation to all pertinent parties such that the user can choose to exit the vehicle when safe.

In a second method, the device is provided to the user as integrally attached to the vehicle. First, a device is provided comprised of a body, a solar panel, a stem, a rear surface with at least one first mirror and at least one second mirror, a battery, a charging port, at least one light, and at least one motion sensor. A user can then adjust the first mirror such that it is visible to the user while sitting in the rear of vehicle and provides an extended view of the surroundings of the vehicle and position the second mirror such that it provides the passenger of the vehicle with enhanced vision of the blind spot area of the vehicle. Then, when a user wishes to exit the vehicle, the user can look into the mirrors to check for oncoming traffic. Upon detecting a motion considered to be hazardous based on its size and distance from the parked vehicle, and/or upon detection of the vehicle door opening, the motion sensor triggers the light mechanism such that light illuminates in such a way that it alerts nearby motorists of a present passenger and opening door, and in such a way that it alerts the passenger of the presence of a motorist or other such hazard in the near vicinity, effectively providing advanced information and awareness of the situation to all pertinent parties such that the user can choose to exit the vehicle when safe.

Accordingly, the safety view passenger door mirror device of the present invention is particularly advantageous as it provides a device that reduces the risk of collision or injury to passengers and motorists alike. More specifically, the safety view passenger door mirror device provides passengers with an enhanced view of their surroundings outside of the vehicle; it also alerts nearby motorists of the presence of a passenger inside of a parked car and provides them with the opportunity to proactively avoid collision or injury. Furthermore, the device can be applied universally to any vehicle. Additionally, the device can be included as a standard feature in any vehicle. In this manner, the safety view passenger door mirror device provides a universal solution to the risk of collision and injury between passengers, parked vehicles, and nearby motorists.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that reduces the risk of injury and collision due to lack of awareness of one's surroundings when exiting a parked car. More specifically, there exists a long-felt need in the art for a device that eliminates the blind spot for passengers exiting vehicles and that alerts nearby motorists to the presence of an opening door and/or exiting passenger. Additionally, there exists a long-felt need in the art for a device that provides motorists in close proximity to a parked, occupied vehicle with information of the passenger's presence and gives substantial time during which they can make an informed and proactive decision to reduce the risk of injury, harm, or collision. Furthermore, there exists a long-felt need in the art for a device which provides passengers of a parked car with a full view of their surrounding area, including potential hazards such as nearby motorists, and allows them to make a safe decision in regard to opening the door and/or exiting the vehicle. Thus, there exists a long-felt need in the art for a safety view passenger mirror device that can be included as a standard feature in passenger vehicles or can be provided separately and applied to the back passenger doors of a vehicle with the purpose of eliminating blind spots, alerting nearby motorists, and reducing the risk of collision and injury, wherein the device can be universally applied to any vehicle.

The present invention, in one exemplary embodiment, is comprised of a safety view passenger door mirror device. The device is comprised of a body, at least one mirror, at least one method of powering and/or charging the device, a fastener, a motion sensor, and an alert system. The mirror(s) on the device are designed to provide the passenger with an enhanced view of their surroundings, especially in areas that would otherwise be considered a "blind spot." The fastener is designed to allow the device to be applied universally to any vehicle. The charging system is designed to allow the user to use the device via solar power, battery power, an AC power source, or a combination of these methods. The motion detecting system is designed to communicate information to the alert system, activating the alert system when a hazard is present within a certain distance from the vehicle. The alert system should be comprised of a method of alerting both passengers and nearby vehicles/motorists of the possibility of a hazard, which would preferably be accomplished with a visual, lighted element that can be seen by both passengers and motorists alike.

More specifically, the device is comprised of a body, comprising at least one but preferably two mirrors. One of the mirrors should preferably be a regular mirror providing a view of the area surrounding the vehicle, while the second mirror should be a blind-spot mirror, and most preferably comprised of a concave or curved design which provides an enhanced and extended view of the area surrounding the vehicle, especially the "blind spot" area where the regular mirror might not provide adequate visibility. The device is also comprised of at least one charging method, which preferably would be comprised of a combination of solar charging, a rechargeable battery, and/or an AC power source, providing the user with multiple methods by which to charge and power the device. The device is additionally comprised of a fastener, comprised of a fastening method such as strong magnets, adhesive, tension-based fastening method, clamps, hardware such as screws or nails, suction cups, or a similar method by which the device can be universally applied to any vehicle. Furthermore, the device is comprised of a motion detecting system and an alert system. The motion detecting system should preferably work in tandem with the alert system, wherein the alert system would be triggered by the motion detecting system when the device is in use. The alert system should be comprised of a method of alerting both passengers and nearby vehicles, which would preferably be comprised of a solid, flashing, blinking, or otherwise indicative light or system of lights.

During use, the device is attached to a vehicle by way of the fastener. The device may also come fixed to the vehicle, attached to the door pillar, and included as a standard element of a passenger vehicle, negating the need for manual fastening of the device to the vehicle. Then, the mirror(s) on the body is positioned in such a way that the passenger inside the vehicle is provided with an enhanced view of their surroundings when viewing the mirrored area of the device. As a result, the passenger has increased awareness of the landscape within a reasonable proximity of the parked vehicle. Furthermore, the device is fitted with a motion detecting system which preferably communicates with an alert system on the device. Together, the motion detecting system and alert system provide the passenger of the vehicle with a warning signal, preferably in the form of a light display, alerting them to the presence of a hazard, such as a moving vehicle or other type of motorist in the near vicinity. Additionally, the alert system preferably should also serve to alert nearby motorists of the presence of a passenger in the parked vehicle and the possibility of the vehicle door being opened.

The present invention is also comprised of two methods of using the device. In a first method, the device is provided to the user as an entity separate (i.e., removably attached) from the vehicle. First, a device is provided comprised of a body, a solar panel, a stem, at least one fastener, a rear surface with at least one first mirror and at least one second mirror, a battery, a charging port, at least one light, and at least one motion sensor. Then, the device is attached to the vehicle by way of the fastener, wherein the device is fastened to the vehicle on the door pillar in the area between the first side window and the second side window. A user can then adjust the first mirror such that it is visible to the user while sitting in the rear of vehicle and provides an extended view of the surroundings of the vehicle and position the second mirror such that it provides the passenger of the vehicle with enhanced vision of the blind spot area of the vehicle. Then, when a user wishes to exit the vehicle, the user can look into the mirrors to check for oncoming traffic. Upon detecting a motion considered to be hazardous based on its size and distance from the parked vehicle, and/or upon detection of the vehicle door opening, the motion sensor triggers the light mechanism such that light illuminates in such a way that it alerts nearby motorists of a present passenger and opening door, and in such a way that it alerts the passenger of the presence of a motorist or other such hazard in the near vicinity, effectively providing advanced information and awareness of the situation to all pertinent parties such that the user can choose to exit the vehicle when safe.

In a second method, the device is provided to the user as integrally attached to the vehicle. First, a device is provided comprised of a body, a solar panel, a stem, a rear surface with at least one first mirror and at least one second mirror, a battery, a charging port, at least one light, and at least one motion sensor. A user can then adjust the first mirror such that it is visible to the user while sitting in the rear of vehicle and provides an extended view of the surroundings of the vehicle and position the second mirror such that it provides the passenger of the vehicle with enhanced vision of the blind spot area of the vehicle. Then, when a user wishes to exit the vehicle, the user can look into the mirrors to check for oncoming traffic. Upon detecting a motion considered to be hazardous based on its size and distance from the parked vehicle, and/or upon detection of the vehicle door opening, the motion sensor triggers the light mechanism such that light illuminates in such a way that it alerts nearby motorists of a present passenger and opening door, and in such a way that it alerts the passenger of the presence of a motorist or other such hazard in the near vicinity, effectively providing advanced information and awareness of the situation to all pertinent parties such that the user can choose to exit the vehicle when safe.

Accordingly, the safety view passenger door mirror device of the present invention is particularly advantageous as it provides a device that enhances passenger and motorist awareness and thus reduces the likelihood of collision, harm, or injury to passengers and motorists alike. More specifically, the safety view passenger door mirror device provides passengers with a comprehensive view of their surroundings from inside the vehicle. The device also provides nearby motorists with an alert signaling that there may be a door opening and/or a passenger emerging from a nearby parked vehicle. This information supports both the passenger's and the motorist's ability to make an informed, proactive decision and prevent injury, collision, or harm. Furthermore, the device can be included as a standard feature of virtually any vehicle, or it can be provided as a separate entity and applied universally to virtually any vehicle. In this manner, the safety view passenger door mirror device provides a universal solution to reducing the risk and incident rate of collision, injury, and harm between passengers of parked vehicles and motorists in moving vehicles nearby.

Figure 1:
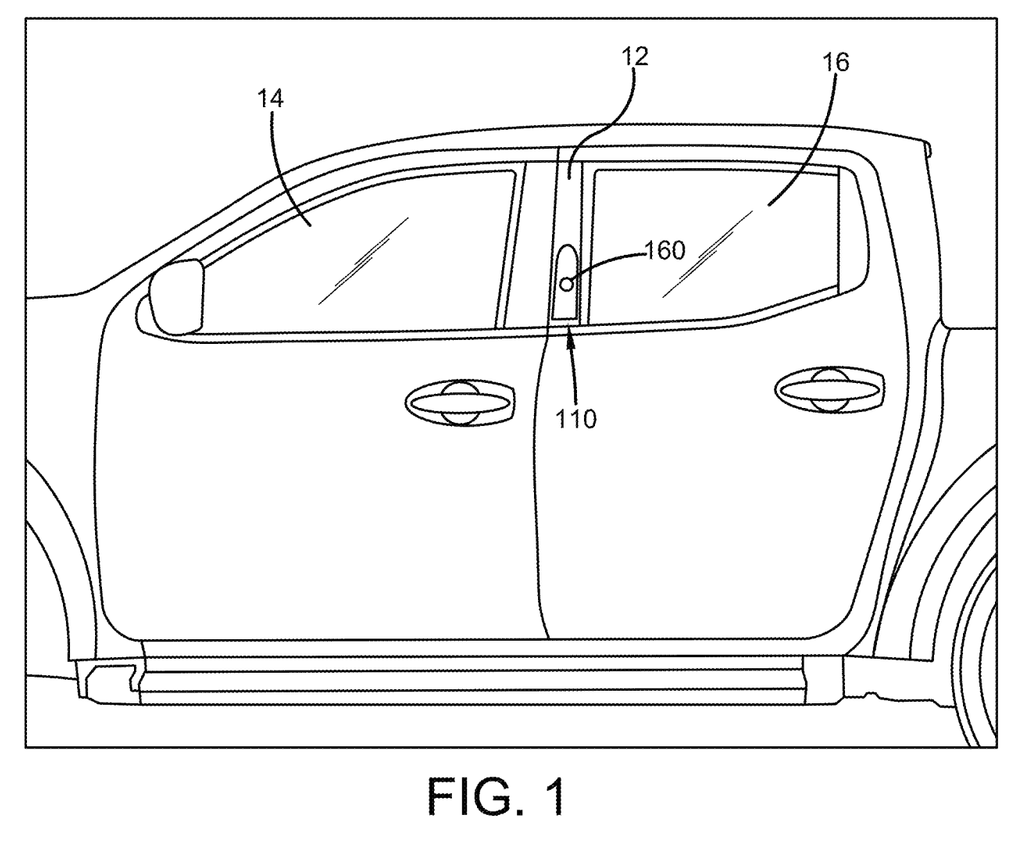
FIG. 1 illustrates a side view of one potential embodiment of a safety view passenger door mirror device of the present invention while attached to a vehicle in accordance with the disclosed architecture.
Figure 2:
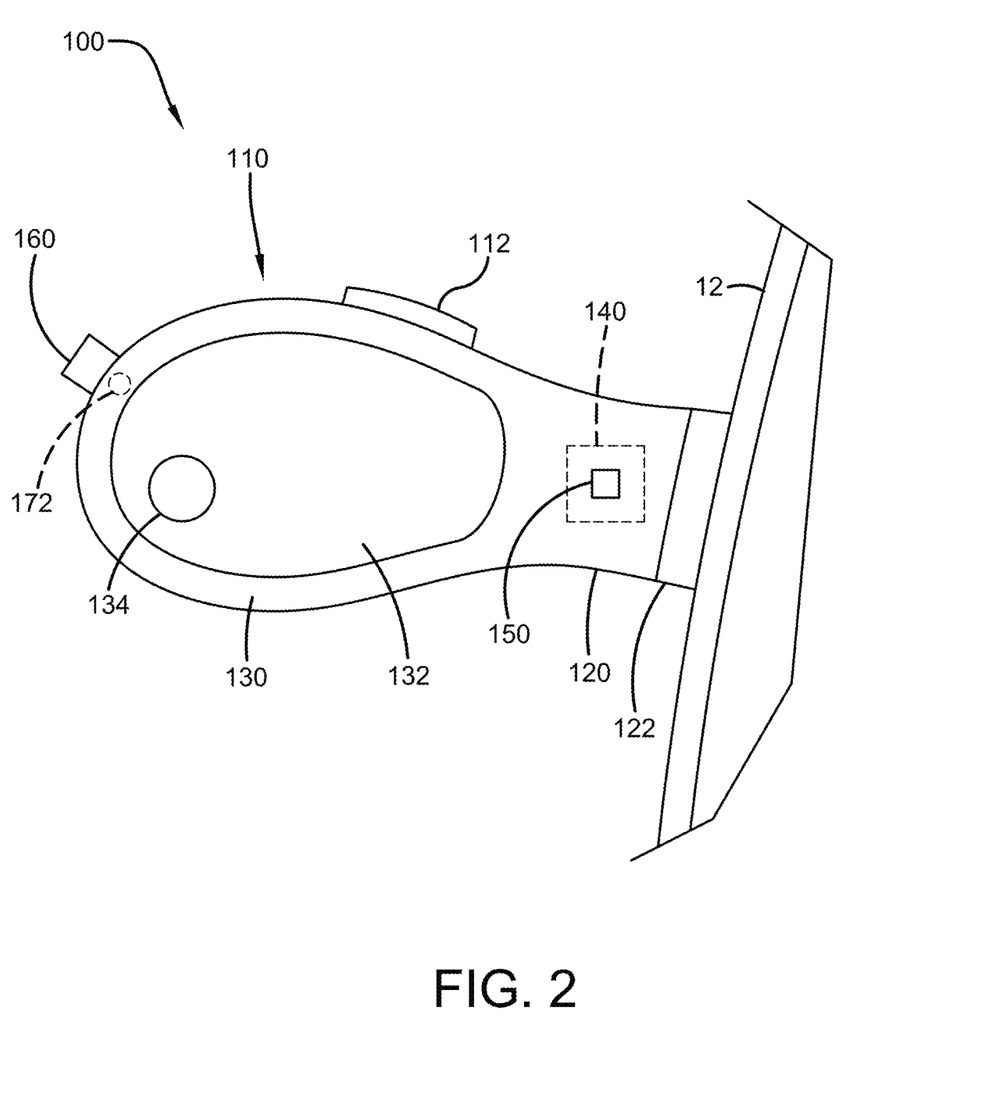
FIG. 2 illustrates a rear view of one potential embodiment of a safety view passenger door mirror device of the present invention while attached to a vehicle in accordance with the disclosed architecture.

Referring initially to the drawings, FIG. 1 illustrates a perspective view of one potential embodiment of a safety view passenger door mirror device 100 of the present invention in accordance with the disclosed architecture. Furthermore, FIG. 2 illustrates a perspective view of a body 110, a solar panel 112, a stem 120, a fastener 122, a rear surface 130, a first mirror 132, a second mirror 134, a battery 140, a charging port 150, a light 160, and a motion sensor 172 of one potential embodiment of the device 100, wherein the device 100 is attached to a vehicle 10 at the door pillar 12. The body 110 and stem 120 should preferably be made from a sturdy material, such as metal or strong plastic.

The rear surface 130 of the device 100 is preferably be made from a sturdy material, such as metal or strong plastic, and should be made from the same material as the body 100 and stem 120. The rear surface 130 is visible to the passenger sitting in the rear seat of a vehicle while the device 100 is in use. Furthermore, the rear surface 100 is comprised of at least one first mirror 132, and in another embodiment, at least one second mirror 134, wherein the position/angle of both mirrors 132,134 is adjustable. The first mirror 132 is preferably comprised of a standard car mirror. The second mirror 134 is preferably comprised of a blind spot mirror of concave or convex design, which provides an enhanced field of vision to the passenger in addition to the first mirror 134. In this embodiment, the second mirror 134 should preferably be of a considerably smaller size than the first mirror 132, and the second mirror 134 should be positioned atop the first mirror 132 and positioned on the portion of the first mirror 132 that sits furthest from the vehicle 10 to ensure the widest field of view for the second mirror 134.

The body 110 of the device 100 contains a solar panel 112 which is used to charge the battery 140 used to power the device 100. The body 110 is also comprised of at least one stem 120 that attaches the body 110 to the door pillar 12 of a vehicle. In one embodiment, the stem 120 is fixedly attached to the door pillar 12 (or other area of the vehicle near at least one passenger door) during the manufacturing process. In another embodiment, the stem 120 is comprised of at least one fastener 122. The fastener 122 is preferably comprised of a magnet, adhesive, tension-based fastening method, clamps, hardware such as screws or nails, suction cups, or a similar method by which the device can be universally applied to any vehicle 10. As noted, the stem 120 is preferably positioned near the door pillar 12 in the area between the first side window 14 and the second side window 16 by way of the fastener 122 or via integrated manufacturing.

The body 110 of the device 100 is also comprised of at least one battery 140 and a charging port 150. The battery 140 is preferably be situated inside the body 110 of the device 100 and is used to power the light 160 and motion sensor 172. In one embodiment, the battery 140 is charged by at least one solar panel 112 positioned on the body 110 which provides power to the battery 140. Alternatively, the charging port 150 may allow a user to recharge the battery 140, wherein the charging port 150 is a USB port, an AC power port, or a similar charging connection known in the art.

The device 100 also alerts passengers and motorists of the potential danger when a user is exiting the vehicle. The device 100 is comprised of at least one light 160 and at least one motion sensor 172. The light 160 and motion sensor 172 should both preferably be powered by the battery 140. The light 160 preferably should be positioned on the body 110 of the device 100 wherein it is visible to passengers and motorists when illuminated. The motion sensor 172 should preferably be positioned on the rear surface 130 of the device, specifically in a position where it can detect any hazardous motion within a reasonable proximity of the parked vehicle.

The motion sensor 172 should preferably be activated when the vehicle 10 is approaching a stop, fully stopped, and/or shifted into park. While activated, the motion sensor 172 is in electrical communication with the light 160, wherein the light 160 is activated when a hazard is detected by the motion sensor 172 within a specific proximity distance (i.e., 10 feet) of the parked vehicle the device 100 is attached to. The motion sensor 172 should also trigger illumination of the light 160 when movement of the passenger door is detected, alerting nearby motorists and vehicles of the presence of a passenger and the opening of the door of the parked vehicle 10. When the light 160 is triggered, it should illuminate in such a way that it alerts both the passenger and any motorists of hazards in the immediate area. The light 160 can illuminate in a flashing or strobing pattern of any kind or can illuminate in a solid state and in any color. The light 160 may shine down onto the street surface below, backwards in the direction of oncoming traffic, upwards into the sky in the manner of a flare, or in any other direction wherein the light 160 accomplishes the goal of alerting oncoming motorists to the presence of a passenger.

Figure 3:
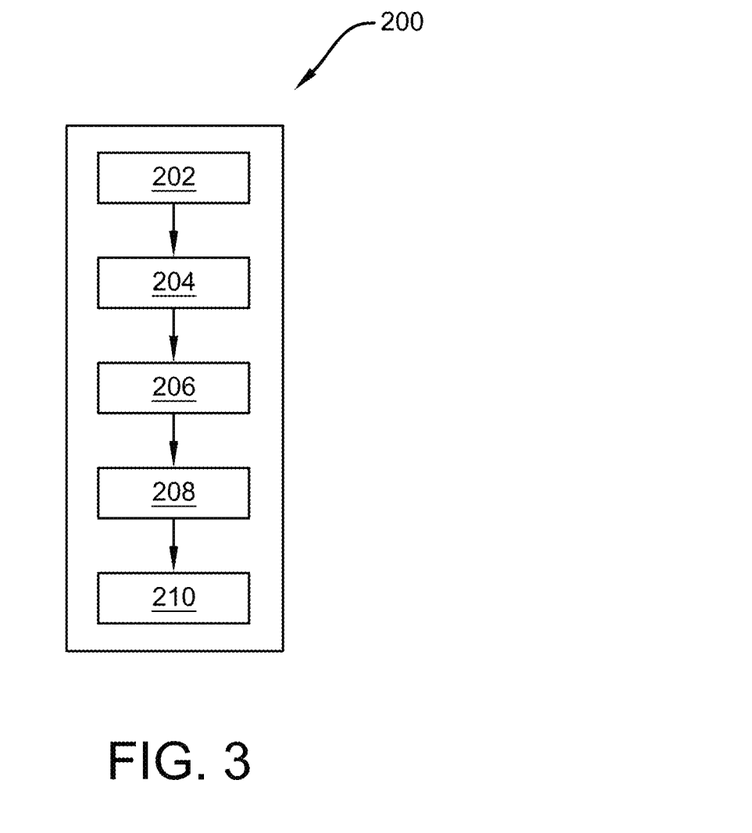
FIG. 3 illustrates a flowchart of a method of using one potential embodiment of a safety view passenger door mirror device of the present invention in accordance with the disclosed architecture.

The present invention is also comprised of a method of using 200 the device 100, wherein the device 100 is provided to the user as an entity separate (i.e., removably attached) from the vehicle 10, as seen in FIG. 3. First, a device 100 is provided comprised of a body 110, a solar panel 112, a stem 120, at least one fastener 122, a rear surface 130 with at least one first mirror 132 and at least one second mirror 134, a battery 140, a charging port 150, at least one light 160, and at least one motion sensor 172 [Step 202]. Then, the device 100 is attached to the vehicle 10 by way of the fastener 122, wherein the device 100 is fastened to the vehicle on the door pillar 12 in the area between the first side window 14 and the second side window 16 [Step 204]. A user can then adjust the first mirror 132 such that it is visible to the user while sitting in the rear of vehicle 10 and provides an extended view of the surroundings of the vehicle 10, and position the second mirror 134 such that it provides the passenger of the vehicle 10 with enhanced vision of the blind spot area of the vehicle 10 [Step 206]. Then, when a user wishes to exit the vehicle 10, the user can look into the mirrors 132,134 to check for oncoming traffic [Step 208]. Upon detecting a motion considered to be hazardous based on its size and distance from the parked vehicle 10, and/or upon detection of the vehicle 10 door opening, the motion sensor 172 triggers the light 160 mechanism such that light 160 illuminates in such a way that it alerts nearby motorists of a present passenger and opening door, and in such a way that it alerts the passenger of the presence of a motorist or other such hazard in the near vicinity, effectively providing advanced information and awareness of the situation to all pertinent parties such that the user can choose to exit the vehicle 10 when safe based on the light 160 activation and mirrors 132,134 [Step 210].

Figure 4:
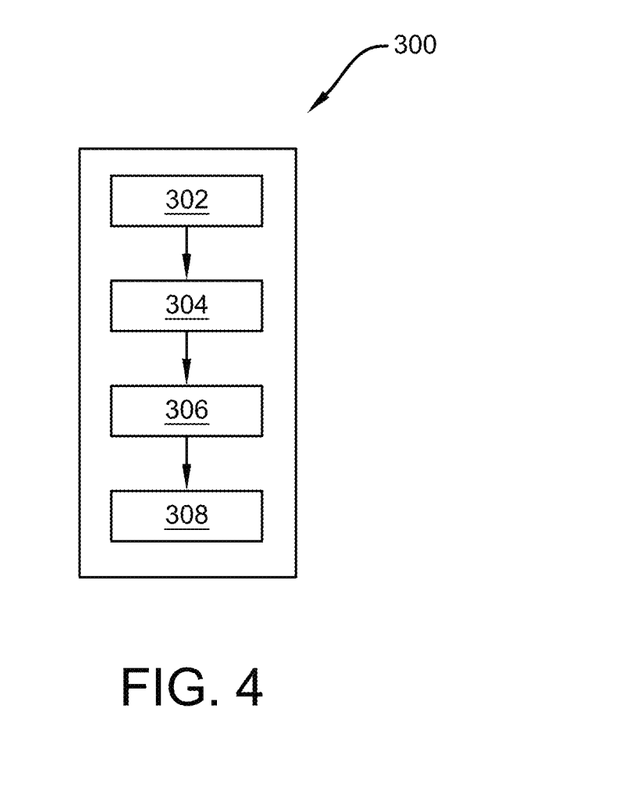
FIG. 4 illustrates a flowchart of a method of using one potential embodiment of a safety view passenger door mirror device of the present invention in accordance with the disclosed architecture.

The present invention is also comprised of a second method of using 300 the device 100 (as seen in FIG. 4), wherein the device 100 is provided as a fixed feature of a vehicle 10, as seen in FIG. 4. First, a device 100 provided, wherein the device 100 is integrally formed to a vehicle 10 between the first side window 14 and second side window 16 and wherein the device 100 is comprised of a body 110, a solar panel 112, a stem 120, a rear surface 130, a first mirror 132, a second mirror 134, a battery 140, a charging port 150, a light 160, and a motion sensor 172 [Step 302]. A user can then adjust the first mirror 132 such that it is visible to the user while sitting in the rear of vehicle 10 and provides an extended view of the surroundings of the vehicle 10 and position the second mirror 134 such that it provides the passenger of the vehicle 10 with enhanced vision of the blind spot area of the vehicle 10 [Step 304]. Then, when a user wishes to exit the vehicle 10, the user can look into the mirrors 132,134 to check for oncoming traffic [Step 306]. Upon detecting a motion considered to be hazardous based on its size and distance from the parked vehicle 10, and/or upon detection of the vehicle 10 door opening, the motion sensor 172 triggers the light 160 mechanism such that light 160 illuminates in such a way that it alerts nearby motorists of a present passenger and opening door, and in such a way that it alerts the passenger of the presence of a motorist or other such hazard in the near vicinity, effectively providing advanced information and awareness of the situation to all pertinent parties such that the user can choose to exit the vehicle 10 when safe based on the light 160 activation and mirrors 132, 134 [Step 308].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "safety view passenger door mirror device" and "device" are interchangeable and refer to the safety view passenger door mirror device 100 of the present invention.

Notwithstanding the foregoing, the safety view passenger door mirror device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the safety view passenger door mirror device 100 as shown in the FIGS. are for illustrative purposes only, and that many other sizes and shapes of the safety view passenger door mirror device 100 are well within the scope of the present disclosure. Although the dimensions of the safety view passenger door mirror device 100 are important design parameters for user convenience, the safety view passenger door mirror device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A safety view passenger door mirror device comprising:
    a body comprised of a stem and a rear surface;
    a magnetic fastener positioned on the stem for securing the body to a vehicle door;
    a first mirror positioned on the rear surface;
    a second concave mirror positioned on a portion of the first mirror;
    a battery positioned within the body;
    a motion sensor positioned on the rear surface; and
    a light positioned on the body.

2. The safety view passenger door mirror device of claim 1, wherein the mirror is comprised of an angle adjustable mirror.

3. A safety view passenger door mirror device comprising:
    a body comprised of a stem and a rear surface;
    a suction fastener positioned on the stem for securing the body to a vehicle door;
    a motion sensor;
    a first mirror positioned on the rear surface;
    a battery positioned within the body;
    a light positioned on the body; and
    a second blind spot concave mirror positioned atop a portion of the first mirror furthest from the vehicle door.

4. The safety view passenger door mirror device of claim 3, wherein the battery is comprised of a charging port.

5. The safety view passenger door mirror device of claim 4, wherein the charging port is comprised of a USB port.

6. The safety view passenger door mirror device of claim 3, wherein the motion detected by the motion sensor activates the light.

7. The safety view passenger door mirror device of claim 6, wherein the light illuminates in a flashing pattern.

8. The safety view passenger door mirror device of claim 6, wherein the light illuminates in a continuous illumination pattern.

9. The safety view passenger door mirror device of claim 3 further comprised of a solar panel.

10. The safety view passenger door mirror device of claim 9, wherein solar panel is positioned on the body.

11. The safety view passenger door mirror device of claim 9, wherein the solar panel provides power to the battery.

12. The safety view passenger door mirror device of claim 3, wherein the motion sensor is positioned on the rear surface.

13. The safety view passenger door mirror device of claim 3, wherein the light is positioned on the rear surface.

14. A method of using a safety view passenger door mirror device, the method comprising the following steps:

providing a safety view passenger door mirror device comprised of a body comprised of a stem and a rear surface comprised of a first mirror, a second smaller concave mirror positioned on a portion of the first mirror, a motion sensor, a battery, and a light positioned on the body;

adhesively attaching the stem of the body to a vehicle door;

adjusting an angle of the mirror such that the mirror is visible to a user while sitting in a rear of a vehicle; and looking into the mirror and at the light before exiting the vehicle.

\* \* \* \* \*